United States Patent [19]

Gerhart et al.

[11] Patent Number: 5,734,473
[45] Date of Patent: Mar. 31, 1998

[54] METHOD OF DETERMINING POLARIZATION PROFILES FOR POLYCHROMATIC SOURCES

[75] Inventors: Grant R. Gerhart, Bloomfield Hills; Roy M. Matchko, Detroit, both of Mich.

[73] Assignee: United States of America as represented by the Secretary of the Army, Washington, D.C.

[21] Appl. No.: 775,263

[22] Filed: Feb. 27, 1997

[51] Int. Cl.[6] .................................................. G01J 4/00
[52] U.S. Cl. ................................. 356/364; 356/367
[58] Field of Search ............................. 356/364, 365, 356/366, 367, 368, 369; 250/225

[56] References Cited

U.S. PATENT DOCUMENTS 3,700,334  10/1972  Low et al. ........................... 356/351
4,681,450  7/1987  Azzam ................................. 356/367
5,227,623  7/1993  Heffner ............................... 356/364
5,396,329  3/1995  Kalawsky ............................ 356/367

Primary Examiner—Hoa Q. Pham
Attorney, Agent, or Firm—Peter A. Taucher; David L. Kuhn

[57] ABSTRACT

A method for determining polarization profiles of individual wavelengths within a polychromatic source utilizes a variable filter system comprised of a retarder and a linear polarizer. Polychromatic light from the source is transmitted through the system and exits therefrom with attenuated intensities unique for each wavelength of the light. The attenuated intensities are recorded by a spectroradiometer and used to calculate Stokes parameters for each wavelength. The inherent problem of the retarder introducing a different phase differential for each individual wavelength transmitted therethrough is solved by expressing the Stokes parameters explicitly as a function of wavelength. The primary purpose of the method is to obtain the four Stokes parameters for individual bands of wavelength within a polychromatic light beam.

12 Claims, 2 Drawing Sheets

METHOD OF DETERMINING POLARIZATION PROFILES FOR POLYCHROMATIC SOURCES

GOVERNMENT USE

The invention described here may be made, used and licensed by or for the U.S. Government for governmental purposes without paying us royalty.

BACKGROUND

When light interacts with matter, the state of the light's polarization can be modified by reflection, refraction, absorption, transmission and scattering. An input beam aimed at a target can be thought of as a probe, and the output beam can be thought of as a signature of the target. Knowledge of the states of polarization of input and output beams gives information about the composition, structure, and orientation of the target. Comparing polarization states of input and output beams is done in mineralogical analysis, organic chemical analysis, molecular structure determination, textile fiber analysis, medical diagnosis, pollution monitoring and photoelastic stress analysis.

A seminal method to determine the state of polarization of a light beam using measurable quantities is the Stokes method, which involves measuring four intensities of the light beam. Each measurement corresponds to the intensity of the beam after it passes through each of four different filter system arrangements. The four Stokes parameters, sometimes called $S_0$, $S_1$, $S_2$ and $S_3$, are derived from these measured intensities and form a four element column vector in four-dimensional mathematical space.

Since the discovery of the Stokes method in 1852, many filter systems based thereon have been presented. Yet a major problem still exists in using the method for polychromatic light when a retarder is used in the filter system. The problem occurs because the retarder causes a different phase between light beam components which pass through it for each different wavelength. Unless the Stokes parameters are corrected for these phase differences, the resulting polarization profiles will be incorrect.

One remedy to this problem employs an achromatic retarder in the filter system. Although recent developments have produced effective retardations achromatic over a wide range of wavelengths, they typically consist of a large number of quarter-wave and half-wave plates which all must be properly aligned.

SUMMARY OF THE INVENTION

Our method of determining polarization profiles for polychromatic beams uses a single retarder and corrects for the phase differences produced by different wavelengths passing through the filter system. We use a relatively simple, inexpensive two element variable filter system which can be packaged in a compact instrument for measuring light. Our method assures that the two elements, a polarizer and a retarder are present for all necessary measurements; that is, neither the polarizer nor the retarder needs to be removed for any measurements. We believe that eliminating the need to remove the polarizer and retarder from our two element filter system is a unique aspect of our method. Additionally, the filter system is easier to calibrate than most current filter systems and does not require a specially tuned retarder.

In our method, an incident light beam passes perpendicularly through the retarder and polarizer at four varied relative positions, or settings, of the retarder and polarizer. The resulting light beam has attenuated intensities corresponding to wavelengths in the incident beam. The attenuated intensities are recorded by a spectroradiometer for each wavelength for every setting of the retarder and polarizer. The values for the attenuated measurements are substituted into derived equations for the four Stokes parameters. These equations correct for the phase differences produced by the retarder for different wavelengths. From the Stokes parameters for each wavelength is developed a polarization profile for the incident light beam.

DETAILED DESCRIPTION

Figure 1:
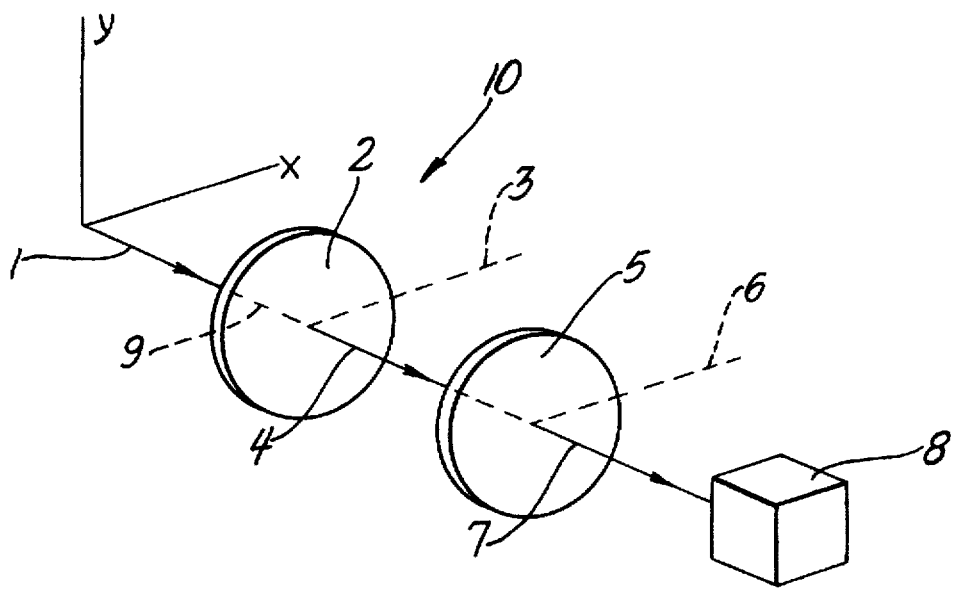
FIGS. 1 through 4 show positions and orientations of the retarder and linear polarizer in the variable filter system used to produce the four attenuated intensities required to calculate the Stokes parameters. These figures also show the position of the spectroradiometer used to detect and record the attenuated intensities.
Figure 2:
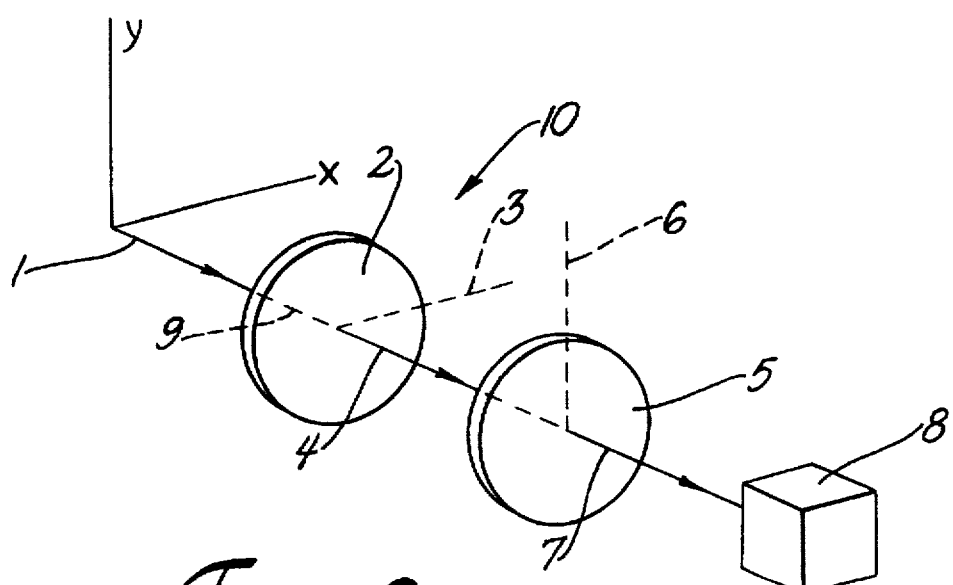
Figure 3:
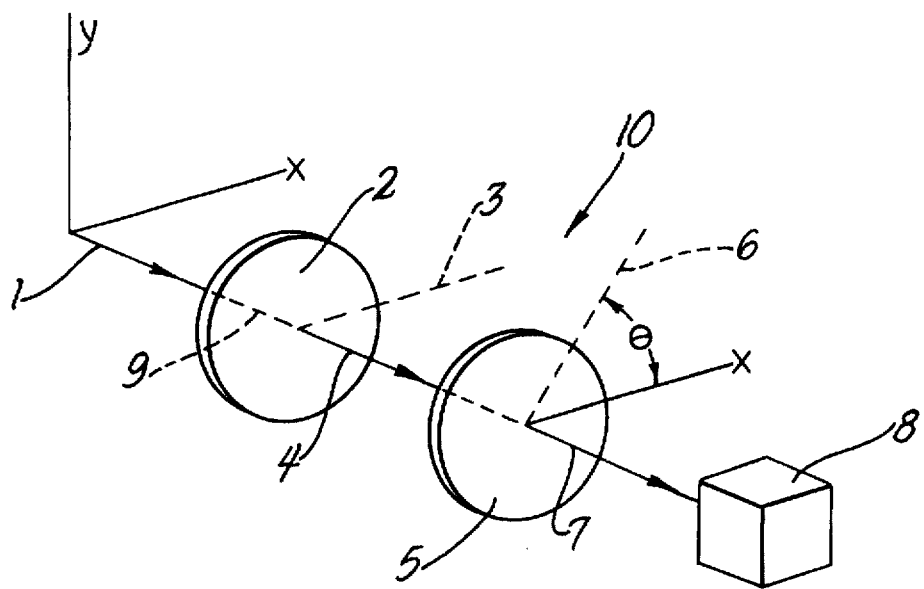
Figure 4:
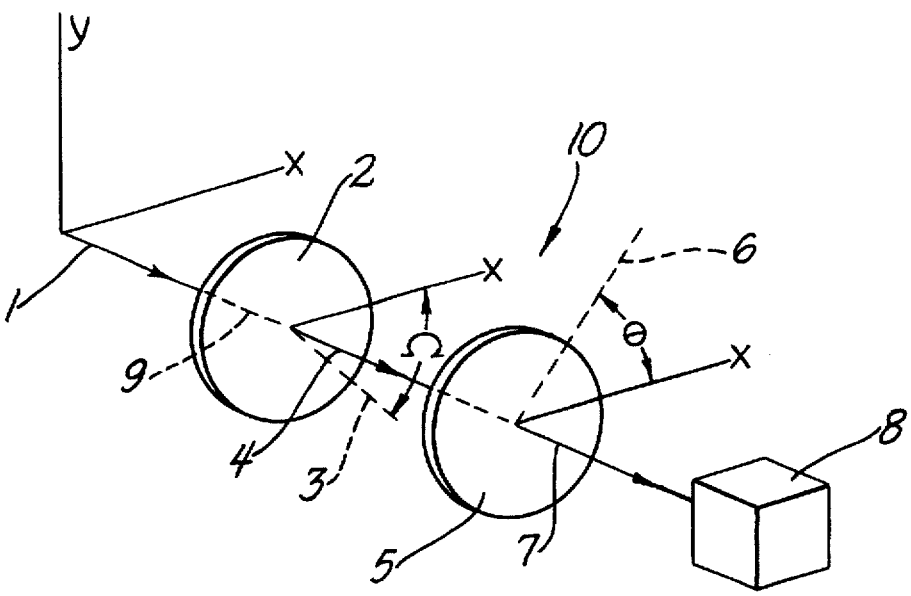

FIGS. 1 through 4 show variable filter system 10, which determines polarization profiles for polychromatic sources. Each Figure shows one of an acceptable set of four juxtapositions of the retarder and linear polarizer for system 10, other acceptable sets of juxtapositions being possible. In each figure, polychromatic incident light beam 1 travels on the z-axis within a rectangular Cartesian coordinate system, the z-axis being designated as reference numeral 9 in the figures. Beam 1 typically has a flat wavelength distribution, where all wavelengths are present in essentially equal intensities.

Light beam 1 is transmitted first through a conventional retarder 2, which has a face perpendicular to the path of light beam 1 and parallel to the x-y plane. During execution of our method, retarder 2 stays on the z-axis, may be turned on the z-axis but does not translate along the z-axis. Fast axis 3 of the retarder is oriented at angle $\Omega$ with respect to the x axis and the x-z plane, $\Omega$ being zero in FIG. 1, 2 and 3 and being $-45°$ in FIG. 4. Retarder 2 causes a phase difference $\epsilon$ between components of any given light wave passing therethrough, $\epsilon$ having a different value for different wavelengths.

The exiting beam 4 from retarder 2 is then transmitted along the z-axis through a conventional linear polarizer 5, which has a face perpendicular to the path of light beams 1 and 4. During execution of our method, polarizer 5 stays on the z-axis, may be turned on the z-axis but does not translate along the z-axis. The polarizer's transmission axis 6 is oriented at an angle $\theta$ with respect to the x-axis and the x-z plane, $\theta$ being zero in FIG. 1, 90° in FIG. 2 and 45° in FIGS. 3 and 4. The exiting attenuated beam 7 from polarizer 5 enters spectroradiometer 8, or any other suitable mechanism which records the intensity for each wavelength of light associated with beam 7. For each setting of variable filter system 10 shown in FIGS. 1 through 4, the intensities of each wavelength are recorded by spectroradiometer 8. These intensities are referred to a as $I(\Omega,\theta,\epsilon)$, where $I(\Omega,\theta,\epsilon)$ denotes the measurement corresponding to a particular set of values for $\Omega$, $\theta$, and $\epsilon$.

Since spectroradiometer 8 separates the polychromatic light of beam 7 into quasi-monochromatic bands, the correction for phase differences produced by retarder 2 for different wavelengths can be based on a quasi-monochromatic light wave theory. Each of the quasi-monochromatic bands segregated by the spectroradiometer can be treated as an incident monochromatic light wave of mean frequency ν. The orthagonal Cartesian components of the electric field of such a light wave can be expressed by the equations:

$$E_x(t) = a_x e^{i(\phi_x - 2\pi\nu t)} \quad (1)$$

$$E_y(t) = a_y e^{i(\phi_y - 2\pi\nu t)} \quad (2)$$

where x and y refer to fixed rectangular axes in the plane perpendicular to the direction of propagation. The quantities $a_x$ and $a_y$ are the instantaneous amplitudes of the two orthogonal components $E_x(t)$ and $E_y(t)$ of the quasi-chromatic light wave after a time t. The quantities $\phi_x$ and $\phi_y$ are the instantaneous phases of and $E_x$ and $E_y$. Also, e is the natural logarithm base and i is the square root of −1.

If the components $E_x(t)$ and $E_y(t)$ are referred to a rotated coordinate system with rectangular axes x' and y' in the plane perpendicular to the direction of beam 1, the new components, $E_x^{(1)}(t)$ and $E_y^{(1)}(t)$ are:

$$E_x^{(1)}(t) = E_x(t) \cos \Omega + E_y(t) \sin \Omega \quad (3)$$

$$E_y^{(1)}(t) = -E_x(t) \sin \Omega + E_y(t) \cos \Omega \quad (4)$$

where $\Omega$ is the angle between the x and the x' axes.

Component $E_x^{(1)}(t)$ will be parallel to the x' axis and component $E_y^{(1)}(t)$ will be parallel to the y' axis. If components $E_x^{(1)}(t)$ and $E_y^{(1)}(t)$ enter a retarder whose fast axis is along the x' axis, there will be a retardation $\epsilon$ along the slow, y', axis. After leaving the retarder, the components parallel to the x' axis and y' axis are, respectively, $E_x^{(1)}(t)$ and $E_y^{(1)}(t)e^{i\epsilon}$. When these components are then referred to the original x-y rectangular axis, these components are given by:

$$E_x^{(2)}(t) = E_x^{(1)}(t) \cos \Omega - E_y^{(1)}(t) e^{i\epsilon} \sin \Omega \quad (5)$$

$$E_y^{(2)}(t) = E_x^{(1)}(t) \sin \Omega + E_y^{(1)}(t) e^{i\epsilon} \cos \Omega \quad (6)$$

If components $E_x^{(2)}(t)$ and $E_y^{(2)}(t)$ enter a linear polarizer with its transmission axis at angle $\theta$ to the x-axis, the component of the electric vector in the $\theta$ direction is $$E^{(3)}(t;\Omega,\theta,\epsilon) = E_x^{(2)}(t) \cos \theta + E_y^{(2)}(t) \sin \theta \quad (7)$$

Using angular brackets to represent averages in time and * to denote a complex conjugate, the intensity $I(\Omega,\theta,\epsilon)$ of the light vibrations leaving linear polarizer is $\langle E^{(3)}(t;\Omega,\theta,\epsilon) E^{(3)*}(t;\Omega,\theta,\epsilon)\rangle$ so that $$I(\Omega,\theta,\epsilon) = J_{xx} \cos^2 (\Omega-\theta) + J_{yy} \sin^2 (\Omega-\theta) + J_{xy} \sin (\Omega-\theta) \cos (\Omega-\theta) e^{-i\epsilon} + J_{yx} \sin (\Omega-\theta) \cos (\Omega-\theta) e^{i\epsilon} \quad (8)$$

where $$J_{xx} = \langle a_x^2 \cos^2\Omega + a_y^2 \sin^2\Omega + a_x a_y \sin 2\Omega \cos\delta \rangle \quad (9)$$
$$J_{yy} = \langle a_x^2 \sin^2\Omega + a_y^2 \cos^2\Omega - a_x a_y \sin 2\Omega \cos\delta \rangle$$
$$J_{xy} = \langle (a_x^2 - a_y^2)\sin\Omega\cos\Omega - a_x a_y \cos 2\Omega \cos\delta - i a_x a_y \sin\delta \rangle$$
$$J_{yx} = \langle (a_x^2 - a_y^2)\sin\Omega\cos\Omega - a_x a_y \cos 2\Omega \cos\delta + i a_x a_y \sin\delta \rangle$$
when $\delta = \phi_x - \phi_y$ The intensity measurements $I(\Omega,\theta,\epsilon)$ for each juxtaposition of retarder 2 and polarizer 5 of FIGS. 1 through 4 can be expressed in terms of equations 9 and 10 as follows:

$$I(0,0,\epsilon) = \langle a_x^2 \rangle \quad (10)$$
$$I(0,90,\epsilon) = \langle a_y^2 \rangle$$
$$I(0,45,\epsilon) = $$
$$½(\langle a_x^2 \rangle + \langle a_y^2 \rangle + 2\langle a_x a_y \cos\delta\rangle \cos\epsilon + 2\langle a_x a_y \sin\delta\rangle \sin\epsilon)$$
$$I(-45,45,0) = \langle ½(a_x^2 + a_y^2) + a_x a_y \cos\delta\rangle$$

Again, using terms from equations 9 and 10, the Stokes parameters $S_0$, $S_1$, $S_2$ and $S_3$ for quasi-monochromatic light, defined in terms of the orthagonal Cartesian components of the electric field of the light, are $$S_0 = \langle a_x^2 \rangle + \langle a_y^2 \rangle \quad (11)$$
$$S_1 = \langle a_x^2 \rangle - \langle a_y^2 \rangle$$
$$S_2 = 2\langle a_x a_y \cos\delta\rangle$$
$$S_3 = 2\langle a_x a_y \sin\delta\rangle$$

It follows from equations 10 and 11 that $$S_0 = I(0,0,\epsilon) + I(0,90,\epsilon) \quad (12)$$
$$S_1 = I(0,0,\epsilon) - I(0,90,\epsilon)$$
$$S_2 = 2I(-45,45,0) - S_0$$

$$S_3 = \frac{2I(0,45,\epsilon) - S_0 - S_2 \cos\epsilon}{\sin\epsilon}.$$

Since $\epsilon$, which is the phase retardation angle, or phase difference between the extraordinary (E) and ordinary (O) waves introduced by retarder 2, is a function of wavelength, one must calculate $\epsilon$ for each wavelength in beam 7. One calculates $\epsilon$ thus:

$$\epsilon = \frac{2\pi d(\Delta n)}{\lambda}, \quad (13)$$

where $\lambda$ is wavelength, d is the thickness of retarder 2 and $\Delta n$ is the difference $n_E - n_O$ of the absolute indices of refraction of the retarder. Our empirical results show that there is a mathematical relation between $\lambda/\Delta n$ and $\lambda$ for various retarder materials. Specifically, the following relationship exists for quartz:

$$\lambda/\Delta n = 120.04 \lambda - 6107.0 \quad (14)$$

where $\lambda$ and 6107.0 are in nanometers. Substituting equation 14 into equation 13 yields $$\epsilon = \frac{2\pi d}{120.04\lambda - 6107.0} \quad (15)$$

Here, the terms 120.04 and 6107.0 can be regarded as specific values for q and r, which are constant for any given retarder material but which vary from material to another. Since $\epsilon = \pi/2$ for a quarter wave plate tuned to a wavelength $\lambda_T$, using equation 12, the thickness d can be obtained from:

$$d = 30.01\lambda_T - 1526.8 \quad (16)$$

where $\lambda_T$ and 1526.8 are in nanometers. The retardation $\epsilon$ for any visible wavelength $\lambda$ is obtained by substituting equation 16 into equation 15 to obtain:

$$\epsilon = \frac{\pi}{2} \left( \frac{\lambda_T - 50.876}{\lambda - 50.876} \right) \quad (17)$$

Here, the term 50.876 can be regarded as a specific value for b, which is constant for any given retarder material but which varies from material to another. Either equation 15 or equation 17 can be substituted into the fourth equality, for $S_3$, in equation 12 to obtain an expression for $S_3$ explicitly as a function of wavelength. For example, substituting equation 15 into equation 12 yields the following expression of $S_3$ for a quartz retarder of thickness d:

$$S_3 = \frac{2I(0,45,\epsilon) - S_0 - S_2 \cos\left(\frac{2\pi d}{120.04\lambda - 6107.0}\right)}{\sin\left(\frac{2\pi d}{120.04\lambda - 6107.0}\right)} \quad (18)$$

We believe that our method of finding $S_3$ is original and unique. Conventional methods do not determine $S_3$ values for polychromatic light.

We wish it understood that we do not desire to be limited to the exact details of construction or method shown herein since obvious modifications will occur to those skilled in the relevant arts without departing from the spirit and scope of the following claims.

What is claimed is:

1. A method to determine polarization characteristics of a polychromatic light source, comprising:

establishing an axis;

placing a retarder on the axis, the retarder remaining on the axis during execution of the method;

placing a polarizer on the axis, the polarizer remaining on the axis during execution of the method;

choosing four different relative rotational positions of the retarder and the polarizer on the axis;

wherein a single set of the four rotational positions suffices to obtain measurements necessary to determine polarization characteristics of a plurality of bands of light waves of polychromatic light from the polychromatic light source;

for each relative rotational position of the retarder and polarizer, transmitting the light from the polychromatic source along the axis through the retarder and through the polarizer;

for each relative position of the retarder and polarizer, and after the step of transmitting the light, passing the polychromatic light into an instrument that measures intensities of the bands;

wherein the retarder, polarizer and instrument are a sufficient set of optical elements to obtain the measurements of the intensities needed to determine the polarization characteristics;

using the intensities, determining the polarization characteristics of the bands;

wherein the determining step uses an empirically derived factor to correct for the retarder's differing effects on the bands having different wavelength components, the factor being a function of a characteristic of the retarder and a wavelength associated with a given band whose polarization characteristics are being determined.

2. The method of claim 1 wherein determining the polarization characteristics of the bands includes determining four Stoke parameters for the bands, where the four Stokes parameters are $S_0$, $S_1$, $S_2$ and $S_3$ values, the method further comprising the steps of:

for each of the bands, using the associated wavelength to derive phase retardation effected on the band by the retarder; and using the $S_0$ and $S_2$ values and the phase retardation to derive the $S_3$ value.

3. The method of claim 1 wherein the characteristics of the retarder used to derive the empirically derived factor include q and r, constants associated with the material from which the retarder is made.

4. The method of claim 3 wherein the empirically derived factor is calculated according to the formula where $\epsilon$ is the phase retardation, d is the thickness of the $$\epsilon = \frac{2\pi d}{q\lambda - r}$$

retarder, and $\lambda$ is a wavelength of a given one of the bands.

5. The method of claim 1 wherein the characteristics of the retarder used to derive the empirically derived factor include b, a constant associated with the material from which the retarder is made.

6. The method of claim 5 wherein the empirically derived factor is calculated according to the formula $$\epsilon = \frac{\pi}{2}\left(\frac{\lambda_T - b}{\lambda - b}\right)$$

where $\epsilon$ is the phase retardation, $\lambda$ is a wavelength of a given one of the bands, and $\lambda_T$ is a wavelength to which the retarder is tuned.

7. A method to determine polarization characteristics of a polychromatic light beam, comprising:

establishing an axis;

placing a retarder on the axis;

using the retarder to introduce a unique phase difference for bands of the polychromatic light beam having different wavelengths associated therewith;

placing a polarizer on the axis;

using the polarizer to create unique attenuation for each of the bands;

after the steps of using the retarder and using the polarizer, dispersing the polychromatic light beam into the bands such that the bands are no broader than quasi-monochromatic bands;

detecting the intensity of a plurality of the wave bands;

accomplishing the steps of using the retarder, using the polarizer, dispersing the polychromatic light beam and detecting the intensity for four juxtapositions of the retarder and polarizer;

using detected intensities to determine Stokes parameters $S_0$, $S_1$, and $S_2$ for the one band;

determining the associated wavelengths of the bands;

using the associated wavelengths, determining phase retardations effected on the bands by the retarder;

wherein the determining step uses an empirically derived factor to correct for the retarder's differing effects on the bands having different associated wavelengths, the factor being a function of a characteristic of the retarder and the band's associated wavelength;

for each of the plurality of bands, using the $S_0$ and $S_2$ values and the phase retardation to derive Stokes parameter $S_3$ for the band.

8. The method of claim 7 wherein the accomplishing step is sufficient to obtain all the measurements necessary to determine the polarization characteristics of the plurality of the bands.

9. The method of claim 7 wherein the characteristics of the retarder used to derive the empirically derived factor include q and r, constants associated with the material from which the retarder is made.

10. The method of claim 9 wherein the empirically derived factor is calculated according to the formula $$\epsilon = \frac{2\pi d}{q\lambda - r}.$$

where $\epsilon$ is the phase retardation, d is the thickness of the retarder, and $\lambda$ is a wavelength of a given one of the bands.

11. The method of claim 7 wherein the characteristics of the retarder used to derive the empirically derived factor include b, a constant associated with the material from which the retarder is made.

12. The method of claim 11 wherein the empirically derived factor is calculated according to the formula $$\epsilon = \frac{\pi}{2}\left(\frac{\lambda_T - b}{\lambda - b}\right)$$

where $\epsilon$ is the phase retardation, $\lambda$ is a wavelength of a given one of the bands, and $\lambda_T$ is a wavelength to which the retarder is tuned.

* * * * *